US008061491B2

(12) United States Patent
Tristano et al.

(10) Patent No.: US 8,061,491 B2
(45) Date of Patent: Nov. 22, 2011

(54) ELECTROMECHANICAL LOCKING DEVICE FOR A BRAKE PISTON

(75) Inventors: Nicola Tristano, Matera (IT); Thorsten Gudehus, Ludwigsburg (DE); Corrado Caruso, Bari (IT); Francesco Onorato, Matera (IT)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 12/264,645

(22) Filed: Nov. 4, 2008

(65) Prior Publication Data

US 2009/0120744 A1 May 14, 2009

(30) Foreign Application Priority Data

Nov. 8, 2007 (DE) .......................... 10 2007 053 278

(51) Int. Cl.
*F16D 69/00* (2006.01)
(52) U.S. Cl. .................... 188/265; 188/72.8; 188/162
(58) Field of Classification Search .................. 188/265, 188/72.1, 72.6, 73.1, 73.2, 161, 31
See application file for complete search history.

(56) References Cited

U.S. PATENT DOCUMENTS

| 4,050,554 | A  | * | 9/1977  | Scheffel ........................ 188/203 |
| 7,316,300 | B2 | * | 1/2008  | Danne et al. ................. 188/72.1 |
| 7,370,735 | B2 | * | 5/2008  | Gilles et al. .................. 188/72.7 |
| 7,434,669 | B2 | * | 10/2008 | Halasy-Wimmer et al. .. 188/171 |
| 7,721,853 | B2 | * | 5/2010  | Chittka ......................... 188/72.8 |

* cited by examiner

*Primary Examiner* — Pamela Rodriguez
(74) *Attorney, Agent, or Firm* — Ronald E. Greigg

(57) ABSTRACT

The invention is a electromechanical locking device for a brake piston of a hydraulically actuated wheel brake. The locking device is disposed at least in some portions in the interior of a hollow-cylindrical brake piston. This interior of the brake piston is filled with hydraulic pressure fluid and in the event of brake actuation is subjected to pressure. The invention includes a filler piece and a coupling element, which reduce the pressure-fluid-filled volume of the brake piston, prevent blocking of the locking device in its terminal positions, and make it possible for the two terminal positions of the locking device to be detected and evaluated by an electronic control unit.

20 Claims, 2 Drawing Sheets

ELECTROMECHANICAL LOCKING DEVICE FOR A BRAKE PISTON

CROSS-REFERENCE TO RELATED APPLICATIONS

This application is based on German Patent Application No. 10 2007 053 278.6 filed on Nov. 8, 2007, upon which priority is claimed.

BACKGROUND OF THE INVENTION

1. Field of the Invention

The invention is based on an electromechanical locking device for a brake piston of a hydraulically actuated wheel brake.

2. Description of the Prior Art

One such electromechanical locking device is know for instance from German Patent Disclosure DE 10 2005 055 084 A1. The wheel brake disclosed in this reference is hydraulically actuatable. The wheel brake has a hollow-cylindrical brake piston, whose interior is filled with hydraulic pressure fluid. In the event of brake actuation, a hydraulic pressure is built up by the driver of a vehicle. A pressure force causes a displacement of the brake piston relative to a brake cylinder, in which this brake piston is movably guided. The brake piston presses a brake lining against a rotating brake body, such as a brake disk, and the magnitude of a frictional force that comes to be established between the rotating brake body and the brake lining is proportional to the brake pressure. The frictional force brakes the brake body.

In order to brake a stopped vehicle firmly on the spot in a parking situation, the known wheel brake additionally has an electromechanically actuatable locking device. This locking device includes a spindle that can be driven to execute a rotary motion by an electric drive motor and an intervening gear. The spindle in some portions protrudes into the interior of the brake piston and has a spindle nut. This spindle nut is disposed in a manner fixed against relative rotation, and as a result, a rotary motion of the spindle trips a translational motion of the spindle nut. In one of its terminal positions, the spindle nut is in contact with the brake piston and acts upon it with an axial force. With this axial force, the brake piston acts on the brake lining and presses it against the stationary brake body and thus prevents the latter from being able to execute a rotary motion.

The spindle and the spindle nut occupy a considerable portion of the internal volume of the hollow-cylindrical brake piston. Nevertheless, the remaining space inside the brake piston, which is filled with hydraulic pressure fluid, is relatively large. This has the disadvantages that a comparatively large amount of pressure fluid has to be positively displaced by the driver in order to build up brake pressure, and the response performance of such a wheel brake is therefore not fully satisfactory. In professional circles, such a response performance of a wheel brake is called indirect.

Another disadvantage is that hydraulic pressure fluid does not behave ideally incompressibly, and that therefore with increasing pressure fluid volume in the brake piston, the hydraulic elasticity of a brake circuit also increases. This elasticity is expressed as an unwanted, soft actuation of the service brake.

Moreover, the spindle nut received in a manner fixed against relative rotation is urged axially by the rotationally driven spindle, in its terminal positions, in such a way that mechanical warping can occur between the individual components. This warping makes an ensuing release of the spindle nut from its terminal positions more difficult or even impossible, so that an actuated locking device might still remain blocked, and then the vehicle cannot be moved from that spot.

OBJECT AND SUMMARY OF THE INVENTION

The object of the present invention is to overcome the aforementioned disadvantages.

A locking device according to the invention for a brake piston of a hydraulically actuated wheel brake has the advantage over the prior art that the pressure-fluid-filled interior of the hollow-cylindrical brake piston is reduced to a minimum, and that thus less pressure fluid has to be positively displaced by the driver in order to generate a defined brake pressure. A brake circuit with wheel brakes that have a locking device according to the invention includes less hydraulic pressure fluid in total and thus has less hydraulic elasticity. All in all, the response performance of a brake system can be approved by the invention in the direction of being "more direct."

The filler piece proposed according to the invention is guided axially displaceably in the interior of the hollow-cylindrical brake piston and is operatively connected mechanically to the spindle nut by a coupling element. The coupling element limits a torque that can be transmitted from the spindle to the spindle nut and thus prevents mechanical warping among the components when these components assume one of their terminal positions. Thus the locking device is readily reversible at any time by the drive motor.

Because of the coupling element, the torque that can be transmitted by the drive motor in the terminal positions of the spindle nut is variably high. By monitoring the intensity of the current then flowing to the drive motor, an electronic detection of these terminal positions is detectable by an electronic control unit and can be used to control the locking device. For instance, with the detection of an attained terminal position, the control unit can discontinue flirter delivery of current to the drive motor and can thus secure the locking device against overloads that would reduce its service life.

Securing the spindle nut against joint rotation on the spindle is effected indirectly accordingly to the invention by the filler piece. A rotationally symmetrical component, which is especially inexpensive to manufacture, can therefore be used as the spindle nut.

BRIEF DESCRIPTION OF THE DRAWINGS

The invention will be better understood and further objects and advantages thereof will become more apparent from the ensuing detailed description of a preferred embodiment taken in conjunction with the drawings. In which.

DESCRIPTION OF THE PREFERRED EMBODIMENT

Figure 1:
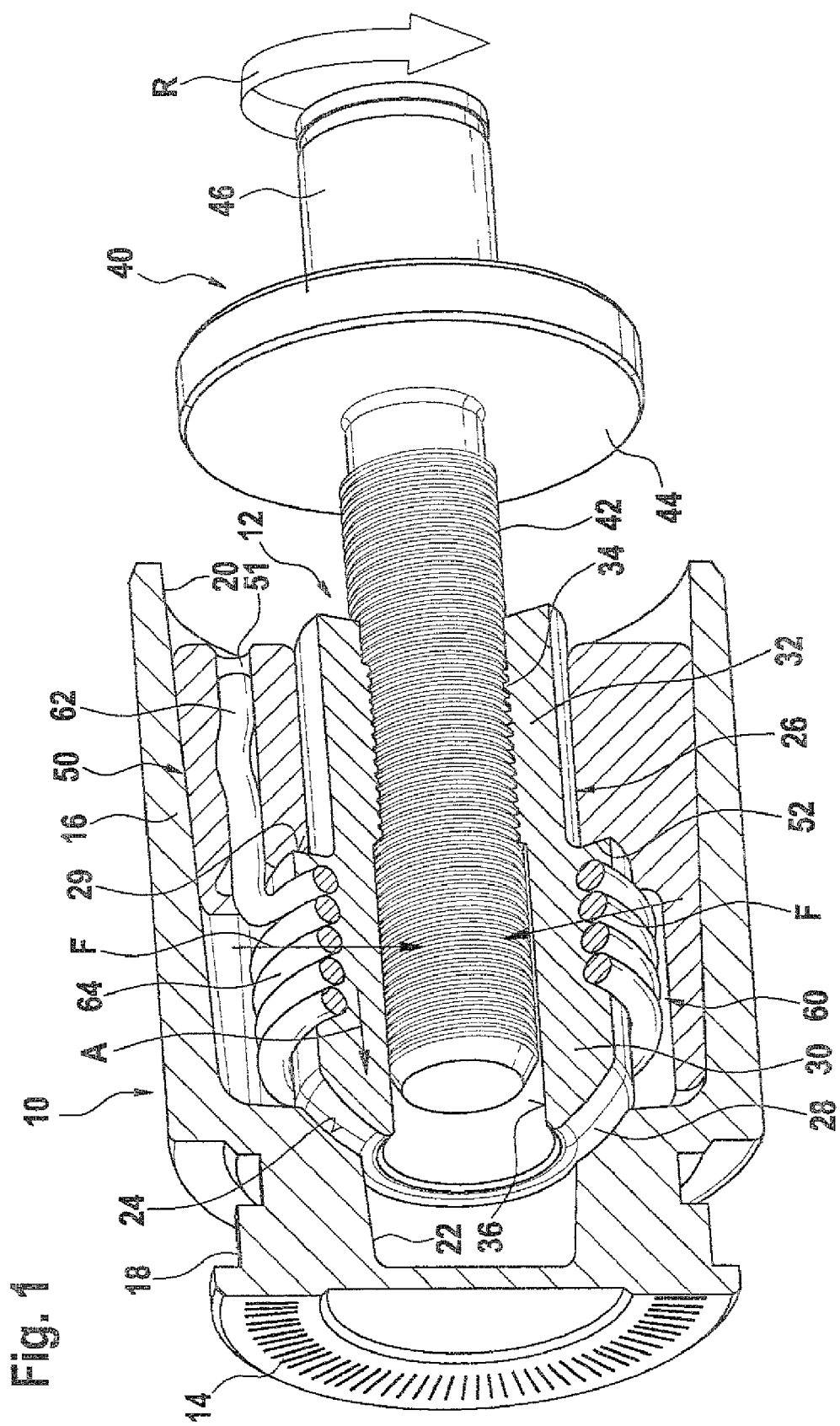
FIG. 1 shows a three-dimensional view of a locking device of the invention in longitudinal section while in a locked position.

In FIG. 1, a brake piston 10 is shown, with a locking device 12 built into it. The brake piston 10 is a hollow-cylindrical component, which is closed in pressure-fluid-tight fashion on one of its ends by a lining contact plate 14. The lining contact plate 14 and a piston shaft 16 are embodied in one piece with one another, and on the circumference of the brake piston 10, between the lining contact plate 14 and the piston shaft 16, a recess 18 is provided, which has a single perpendicular graduation from the outside inward. The interior of the brake piston 10 is divided into two portions 20, 22 of different inside diameters. A first portion 20, located at the open end of the brake piston 10, has a larger inside diameter than a second portion 22, which is oriented toward the lining contact plate 14 and is connected to the first portion 20. The transition from the first portion 20 to the second portion 22 is embodied as a conical indentation 24. This conical indentation is located approximately below the end, remote from the lining contact plate 14, of the recess 18 on the circumference of the brake piston 10.

With one face end 28 shaped as a universal ball joint, a spindle nut 26 rests on the conical indentation 24 of the brake piston 10. The spindle nut 26 is a rotationally symmetrical sleevelike component and is divided into a spindle nut head 30 of thickened outside diameter and a spindle nut neck 32 of reduced outside diameter by comparison. This spindle nut neck 32 is remote from the universal ball joint-shaped end 28 and is provided with a female thread 34. By comparison, the spindle nut head 30 is penetrated by a bore 36, extending coaxially to the female thread 34, and the inside diameter of this bore 36 is greater than the flank diameter of the female thread 34.

With its female thread 34, the spindle nut 26 cooperates with a male thread 42 of a drive spindle 40 that protrudes in some portions into the interior of the brake piston 10. This drive spindle 40 can be driven to a rotary motion by means of an electric drive motor, not shown. The male thread 42 extends from a first end of the drive spindle 40 to a radially protruding, one-piece stop flange 44. This stop flange 44 is located outside the brake piston 10. On the side of the stop flange 44 remote from the male thread 42, the drive spindle 40 continues in the form of a drive peg 46. This drive peg 46 has a cylindrical outer contour and an inner contour that is not apparent, which makes a positive engagement possible between a power takeoff shaft (not shown) of the drive motor and of the drive spindle 40.

Over nearly its entire length, the spindle nut 26 is surrounded by a sleevelike filler piece 50, which largely fills up the existing space between the outer contour of the spindle nut 26 and the inner contour of the brake piston 10. The filler piece 50 is received in the interior of the brake piston 10 in a manner fixed against relative rotation and is axially movably guided in the direction of its longitudinal axis. For the sake of disposition in a manner fixed against relative rotation, radial flattened faces or protrusions (not visible in the drawing) may for instance be embodied on the circumference of the filler piece 50 and cooperate with corresponding protuberances or recesses (also not visible) on the inside surface of the brake piston 10. The filler piece 50 is recessed once at a right angle in its interior, and as a result an encompassing stop shoulder 52 is created. With this stop shoulder 52, the filler piece 50 rests on an outer flank 29 of the spindle nut 26. This outer flank 29 is formed by the transition from the spindle nut head 30 to the spindle nut neck 32.

Coupling of the spindle nut 26 to the filler piece 50 is effected by a coupling element 60. This coupling element 60 is a spiral spring with a plurality of spring windings 64. A spring winding located closest to the filler piece 50 is bent on its end perpendicular to the winding direction and forms a protruding mandrel 62, which extends axially parallel to the longitudinal axis of the coupling element 60. With this mandrel 62, the coupling element 60 engages a recess 51, intended for that purpose, of the filler piece 50. The recess 51 and the mandrel 62 are adapted to one another dimensionally and/or in their shaping in such a way that a clamping connection can be established between the filler piece 50 and the coupling element 60.

With its spring windings 64, the coupling element 60 embraces the head 30 of the spindle nut 26. As a result of spreading a part of the spring windings 64 upon installation of the coupling element 60, an initial spring tension is generated, which urges the spindle nut 26 in the radial direction in space.

By axial stretching of the spring windings 64 upon installation of the coupling element 60, an axial force can furthermore be furnished by the coupling element 60, and this force presses the filler piece 50 with its stop shoulder 52 against the outer flank 29 of the spindle nut 26.

Hereinafter the mode of operation will be described. When the drive spindle 40 is driven counterclockwise, as indicated by the directional arrow R, by a drive motor (not shown), the initial spring tension of the coupling element 60 prevents the spindle nut 26 from rotating jointly with it. The coupling element 60 accordingly assumes its locking position and effects a quasi-rigid connection between the spindle nut 26 and the filler piece 50. A continued counterclockwise rotation of the drive spindle 40 thus trips an axial motion of the spindle nut 26 in the direction of the arrow A. The spindle nut moves to the left in terms of FIG. 1, until its ball-joint-shaped end 28 comes into contact, as shown, with the conical indentation 24 in the interior of the brake piston 10. Once this positive engagement is reached, the brake piston 10 follows along with the axial motion of the spindle nut 26 as well, until finally, a brake lining, braced on the lining contact plate 14, rests on a brake body not shown in the drawing. The torque generated by the drive motor is now converted, by the threaded connection between the drive spindle 40 and the spindle nut 26, into an axial force that acts on the brake lining and thus prevents an incipient rotation of the brake body.

FIG. 1 shows the locking device 12 in its locked position. In it, the locking device 12, with its drive spindle 40, the spindle nut 26, the coupling element 60, and the filler piece 50, fills the interior of the brake piston 10 virtually completely. The remaining voids, which upon a hydraulic actuation of the brake piston 10 are filled with hydraulic pressure fluid that is at high pressure, occupy only minimal volume.

Figure 2:
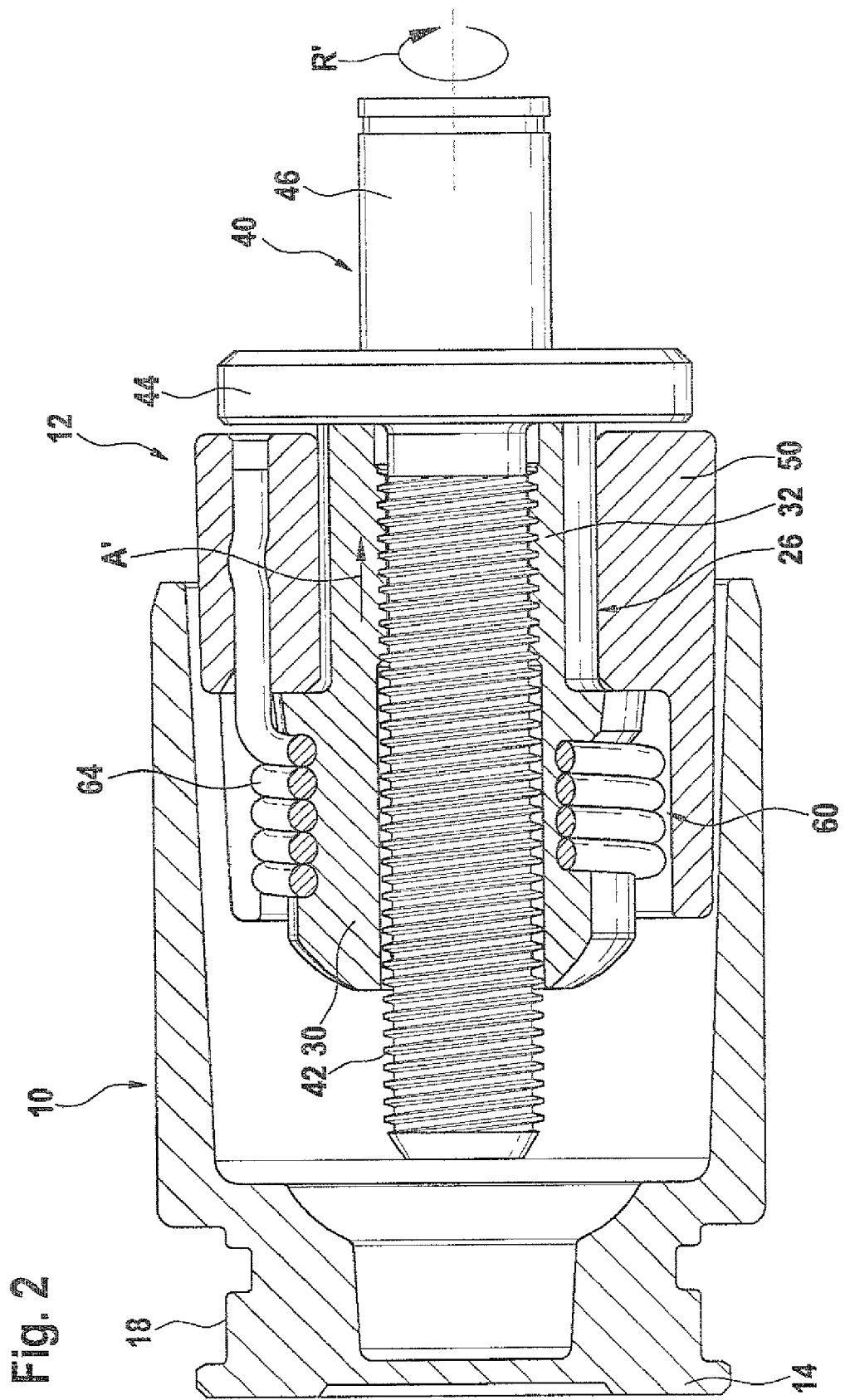
FIG. 2 shows a three-dimensional view in longitudinal section of the locking device in its released position.

FIG. 2 shows the locking device 12 of the brake piston 10 of FIG. 1 in the released position. Components corresponding to one another are identified by the same reference numerals in both drawings.

To put the locking device 12 into the released position shown, the electric drive motor must be driven clockwise (directional arrow R'). The drive motor drives the drive spindle 40 accordingly. Since the direction of rotation of the spindle nut 26 is oriented counter to the winding direction of the spring windings 64 of the coupling element 60, these individual spring windings 64 open, and as a result the effective radial initial tension force of the coupling element 60 on the spindle nut 26 drops. The remaining initial spring tension force of the coupling element 60 nevertheless suffices to prevent joint rotation of the spindle nut 26 with the drive spindle 40. The spindle nut 26, prevented from rotating jointly, thereupon executes an axial motion to the right (directional arrow A') and, because of the existing positive engagement between the spindle head 30 and the filler piece 50, carries this filler piece 50 along with it.

A terminal position is reached when the spindle nut 26, with the end face of its spindle nut neck 32, strikes as show against the stop flange 44 of the drive spindle 40, so that a further axial motion of the spindle nut 26 is prevented. Because of the reduced initial tension force of the coupling element 60, a continued clockwise rotation of the drive spindle 40 enables the spindle nut 26 to begin a clockwise rotary motion as well, and the quasi-rigid connection between the spindle nut 26 and the filler piece 50 is rescinded. The coupling element 60 accordingly assumes a released position, as a result of which the spindle nut 26 can revolve virtually unhindered with the rotating drive spindle 40.

The axial forces with which the spindle nut 26, in the event of an actuation of the locking device 12, is pressed against its two end stops are variably strong, as explained. They are due to the design of the toothing between the drive spindle 40 and the spindle nut 26 and to the initial spring tension of the coupling element 60. For design reasons, the maximally attainable axial forces are small enough for warping among the individual components to be rescinded again by merely reversing the direction of rotation of the drive motor. A locking device 12 according to the invention can therefore be released again from its terminal positions at any time.

As soon as the spindle nut 26 has assumed one of its two terminal positions and can no longer execute any further axial motion, the current consumption of the drive motor increases markedly. This increase in current can be detected and evaluated with the aid of an electronic control unit. In this way, the terminal positions of the spindle nut 26 can be detected relatively simply, and the locking device 12 can be controlled accordingly.

The foregoing relates to a preferred exemplary embodiment of the invention, it being understood that other variants and embodiments thereof are possible within the spirit and scope of the invention, the latter being defined by the appended claims.

We claim:

1. An electromechanical locking device for a brake piston of a hydraulically actuated wheel brake comprising:
    a hollow-cylindrical brake piston;
    a drive spindle protruding into an interior of the brake piston;
    a drive motor rotating the drive spindle in a rotary motion;
    a spindle nut disposed on the drive spindle in a manner so as to be drivable in a translational motion by the rotary motion of the drive spindle; and
    a filler piece surrounding the spindle nut and being received in a manner fixed against relative rotation and axially displaceably in the interior of the brake piston, wherein the filler piece is operatively connected to the spindle nut by means of a coupling element.

2. The electromechanical locking device as defined by claim 1, wherein the coupling element, when the spindle nut assumes a terminal position on the drive spindle, limits a torque that can be transmitted from the drive spindle to the spindle nut.

3. The electromechanical locking device as defined by claim 2, wherein the torque that can be transmitted by the coupling element is variably high, as a function of a direction of rotation of the drive spindle.

4. The electromechanical locking device as defined by claim 3, wherein the coupling element presses the spindle nut and the filler piece against one another with an axial force.

5. The electromechanical locking device as defined by claim 4, wherein the spindle nut rests with an outer flank thereof on a stop shoulder of the filler piece.

6. The electromechanical locking device as defined by claim 5, wherein the coupling element has a first end with at least two spring windings surrounding the spindle nut and subjecting the spindle nut to a radial initial spring tension, and wherein the coupling element has a second end that is solidly connected to the filler piece.

7. The electromechanical locking device as defined by claim 6, wherein the drive spindle has a stop flange for the spindle nut.

8. The electromechanical locking device as defined by claim 4, wherein the coupling element has a first end with at least two spring windings surrounding the spindle nut and subjecting the spindle nut to a radial initial spring tension, and wherein the coupling element has a second end that is solidly connected to the filler piece.

9. The electromechanical locking device as defined by claim 3, wherein the spindle nut rests with an outer flank thereof on a stop shoulder of the filler piece.

10. The electromechanical locking device as defined by claim 2, wherein the coupling element presses the spindle nut and the filler piece against one another with an axial force.

11. The electromechanical locking device as defined by claim 2, wherein the spindle nut rests with an outer flank thereof on a stop shoulder of the filler piece.

12. The electromechanical locking device as defined by claim 2, wherein the coupling element has a first end with at least two spring windings surrounding the spindle nut and subjecting the spindle nut to a radial initial spring tension, and wherein the coupling element has a second end that is solidly connected to the filler piece.

13. The electromechanical locking device as defined by claim 1, wherein the coupling element presses the spindle nut and the filler piece against one another with an axial force.

14. The electromechanical locking device as defined by claim 13, wherein the drive spindle has a stop flange for the spindle nut.

15. The electromechanical locking device as defined by claim 13, wherein the spindle nut is a rotationally symmetrical sleevelike component.

16. The electromechanical locking device as defined by claim 1, wherein the spindle nut rests with an outer flank thereof on a stop shoulder of the filler piece.

17. The electromechanical locking device as defined by claim 1, wherein the coupling element has a first end with at least two spring windings surrounding the spindle nut and subjecting the spindle nut to a radial initial spring tension, and wherein the coupling element has a second end that is solidly connected to the filler piece.

18. The electromechanical locking device as defined by claim 1, wherein the drive spindle has a stop flange for the spindle nut.

19. The electromechanical locking device as defined by claim 18, wherein the stop flange is in one piece with the drive spindle.

20. The electromechanical locking device as defined by claim 1, wherein the spindle nut is a rotationally symmetrical sleevelike component.

* * * * *